(12) United States Patent
Massonnat

(10) Patent No.: US 10,393,922 B2
(45) Date of Patent: Aug. 27, 2019

(54) METHOD AND DEVICE FOR THE CONTROLLED DETERMINATION OF CHANNEL WAVES

(71) Applicant: TOTAL SA, Courbevoie (FR)

(72) Inventor: Gérard Massonnat, Pau (FR)

(73) Assignee: TOTAL SA, Courbevoie (FR)

( * ) Notice: Subject to any disclaimer, the term of this patent is extended or adjusted under 35 U.S.C. 154(b) by 595 days.

(21) Appl. No.: 15/029,552

(22) PCT Filed: Aug. 25, 2014

(86) PCT No.: PCT/FR2014/052118
§ 371 (c)(1),
(2) Date: Apr. 14, 2016

(87) PCT Pub. No.: WO2015/055904
PCT Pub. Date: Apr. 23, 2015

(65) Prior Publication Data
US 2016/0274270 A1  Sep. 22, 2016

(30) Foreign Application Priority Data

Oct. 14, 2013  (FR) .................................... 13 59960

(51) Int. Cl.
*G01V 99/00* (2009.01)
*G06F 17/10* (2006.01)

(52) U.S. Cl.
CPC ............ *G01V 99/005* (2013.01); *G06F 17/10* (2013.01)

(58) Field of Classification Search
CPC .............................. G01V 99/005; G06F 17/10
USPC ............................................................. 703/2
See application file for complete search history.

(56) References Cited

U.S. PATENT DOCUMENTS

2010/0191516 A1 * 7/2010 Benish .................... E21B 43/00
703/10
2013/0144579 A1 * 6/2013 Tetzlaff ............... G06F 17/5009
703/6

FOREIGN PATENT DOCUMENTS

EP       1 926 033 A1   5/2008
FR       1 257 649       2/1961

OTHER PUBLICATIONS

International Search Report and Written Opinion for PCT/FR2014/052118, dated Feb. 4, 2015, 11 pages.
English translation of International Search Report PCT/FR2014/052118, dated Feb. 4, 2015, 2 pages.

* cited by examiner

*Primary Examiner* — Saif A Alhija
(74) *Attorney, Agent, or Firm* — Patterson Thuente Pedersen P.A.

(57) ABSTRACT

The present invention relates to a method for the controlled determination of channel waves on the basis of a model comprising at least one minimum limit distance being associated with a representation. The method comprises a determination of a first trajectory and a first dress-up, the latter being tangent internally to a polar form centered on the well and with the said minimum limit distance as radius. A minimum exclusion zone is then determined as a function of said point of minimum tangency and a second trajectory and a second dress-up are determined in such a way that this second dress-up does not cross the minimum exclusion area. The determination of the second trajectory is repeated if the intersection between the representation of the well and the union of the trajectories determined is empty.

11 Claims, 5 Drawing Sheets

METHOD AND DEVICE FOR THE CONTROLLED DETERMINATION OF CHANNEL WAVES

RELATED APPLICATIONS

The present application is a National Phase entry of PCT Application No. PCT/FR2014/052118, filed Aug. 23, 2014, which claims priority from FR Patent Application No. 13 59960, filed Oct. 14, 2013, said applications being hereby incorporated by reference herein in their entirety.

FIELD OF THE INVENTION

The present invention relates to the determination of mesh geologic models and in particular to mesh models satisfying a number of specific dynamic constraints.

BACKGROUND OF THE INVENTION

For an appropriate determination of hydrocarbon reserves contained in a reservoir, it is useful to establish grids (or mesh models) of the reservoir, for example on the basis of 3D seismic interpretation of the subsurface.

These models must be determined in order to represent as accurately as possible the actual subsurface containing the reservoir.

In the petroleum industry, a well test can provide better understanding of the properties of hydrocarbons and allow determining the characteristics of the reservoir where the hydrocarbons are trapped. Most often, a well test includes alternating phases of drawdown and buildup of the well concerned; the flow and pressure variations over time are recorded. The document "*Well testing interpretation method (Fundamentals of Exploration and Production)*, Gilles Bourdarot, Institut Français du Pétrole Publications, ISSN 1271-9048" or the document "*Well test analysis: the use of advanced interpretation method*, Dominique Bourdet, Elsevier, ISBN 0444509682" present a number of methods for interpreting these flow and pressure variations.

One objective of a well test may be to determine the capacity of the reservoir for producing hydrocarbons such as oil or natural gas.

Another purpose of such a test may be descriptive, i.e. to determine the reservoir geometry and characteristics (rock porosity, presence of boundaries, etc.).

The set of information determined using these well tests is called "dynamic modeling constraints" (for example the volume connected to the well, the presence of reservoir boundaries and associated distance(s), flow properties of fluids flowing to the well, rock porosity, permeability, etc.).

To satisfy dynamic modeling constraints, well engineers or geologists usually determine a large number of "candidate" models by means of known methodologies (for example such as those described in patent application FR1257649 for the determination of channels), then eliminate the models that do not satisfy these dynamic constraints (possibly with a given margin of tolerance).

Such methods are not without flaws, however.

Only a small number of models (possibly having a random portion) will statistically satisfy the dynamic constraints.

Thus, fully calculating the models that are eventually set aside consumes computing resources and can significantly slow the determination of an appropriate model.

There is therefore a need to take dynamic constraints into account as early as possible when determining the geological model, in order to optimize computing resources.

SUMMARY OF THE INVENTION

The invention proposes taking into account the volume constraints and/or the presence of boundaries in the reservoir, when determining geological models.

The invention therefore provides a method, implemented by computer, for the controlled determination of channels on the basis of a model comprising at least:
  a space of points, said points having coordinates in said space,
  a representation of a well in said space, said well representation having coordinates in said space, a minimum distance to boundary being associated with said representation.

The method comprises the steps of:
  determining a first channel path in said model, said first path having a first casing, said first casing being internally tangent to a polar form having a center that is part of the representation and having a radius that is said minimum distance to boundary associated with said representation, said casing being tangential at a point of minimum tangency;
  determining at least one minimum exclusion region in said model as a function of said point of minimum tangency;
  determining at least one second channel path in said model, said second path having a second casing, the intersection of the at least one minimum exclusion region and said second casing being empty, and determining a union between said first path and said at least one second path.

The step of determining at least one second path is repeated if at least one condition is satisfied in a set of conditions comprising:
  /c1/ the intersection of said well representation and said determined union is empty.

The minimum distance to boundary is a distance in the mathematical sense and may correspond to many different distances. In addition, it is possible that the distance is a function of the direction within the space of the model.

The polar form having a center that is part of the representation and having a radius that is said minimum distance to boundary may be, for example, a circle or a square (2D case) or a sphere or a cube (3D case) if the minimum distance to boundary is independent of the directions in the space. Moreover, this polar form may be a cylinder having a vertical axis of revolution.

The term "casing" is used to mean a set of meshes or points located close to the associated path and defining a channel in the model. This channel may be composed of different facies defined in advance by an operator, for example.

When the step of determining at least one second path is repeated, the union determined in this step is "extended" each time with a new path.

Condition /c1/ allows generating the number of second paths needed to connect the well to the network of previously determined paths (first or second).

In addition, the set of conditions may further comprise:
  /c2/ the intersection of the points of the model located at a distance less than the minimum distance to boundary of said representation and the complement of said union forms at least one continuous set of points of at least a predetermined number of points.

Condition /c2/ allows generating the number of second paths necessary to ensure that there is no "block" of points of significant size. The existence of such "blocks" could be viewed as a detectable boundary located at a distance that is less than the minimum distance to boundary.

The evaluation of the number of points in a set may be determined as a function of:
the absolute number of points of the set;
the number of points "visible" from the well representation;
the solid angle of the set of points as seen from the well representation;
etc.

In one embodiment of the invention, the set of conditions may further comprise:
/c3/ the intersection of the points of the model located at a distance less than the minimum distance to boundary of said representation and said determined union in the space forms a plurality of sets of points that are discrete.

Condition /c3/ allows generating the number of second paths necessary to ensure that all the determined channels form a single network of channels in the region located at a distance less than the minimum distance to boundary. If multiple disconnected networks existed, another boundary could exist at a distance less than the minimum distance to boundary.

In addition, a second distance to boundary being associated with said representation, the method may further comprise:
determining a third channel path in said model, said third path having a third casing, said third casing being internally tangent to a polar form having a center that is part of the representation and having a radius that is said second distance to boundary, said casing being tangential at a second point of tangency;
determining at least one second exclusion region in said model as a function of said second point of tangency; and wherein:
the intersection of the at least one second exclusion region and said first casing or the at least one second casing or the third casing is empty.
the intersection of the at least one minimum exclusion region and the third casing is empty.

In particular, the second point of tangency, a point that is part of the representation, and the point of minimum tangency may be aligned.

In an alternative embodiment, a first straight line passing through:
the second point of tangency and
a point that is part of the representation
and a second straight line passing through:
the point that is part of the representation and
the point of minimum tangency
may form an angle that is between 180° and a predetermined angle.

The predetermined angle is an angle close to the 180° angle. For example, it may correspond to an angle of 160° or 170°.

Additionally or alternatively to the method described above, a model may include at least:
a space of points, said points having coordinates in said space,
a minimum connected volume value;
at least one representation of a well in said space, said well representation having coordinates in said space, a minimum distance to boundary being associated with said representation, Then, the method may comprise the following steps, for each current representation in the at least one well representation:
/a/ determining a first channel path in said model, said first path having a first casing, said first casing comprising the at least one well representation, and adding said first path to a set of paths;
/b/ determining at least one second channel path in said model, said second path having a second casing;
/c/ if the second path is connected to a path in the set of paths, adding said second path to the set of paths, otherwise repeating steps /b/ and /c/;
/d/ determining a connected volume as a function of the paths in the set of paths, and if the determined volume is less than the minimum value, repeating steps /b/ and /c/.

Steps /a/, /b/ may be the same as the steps described above.

This method allows determining new channels as long as the minimum volume has not been reached.

In one particular embodiment of the invention, said model having at least one maximum connected volume value, the method may further comprise:
$/a_a/$ determining a target connected volume value that is between the minimum value and the maximum value;
$/b_a/$ determining at least a fourth channel path in said model, said fourth path having a fourth casing;
$/c_a/$ determining a first connected volume as a function of the paths in the set of paths, and determining a second connected volume as a function of the paths in the set of paths and of the fourth path,
$/d_a/$ if the fourth path is connected to a path in the set of paths and if the first determined volume is less than or equal to the target value, adding said fourth path to the set of paths and repeating steps $/b_a/$, $/c_a/$, $/d_a/$, and $/e_a/$;
$/e_a/$ if the fourth path is connected to a path in the set of paths and if the second determined volume is greater than the target value:
adding said fourth path to the set of paths and repeating steps $/b_a/$, $/c_a/$, $/d_a/$, and $/e_a/$ if a distance between the second volume and the target value is less than a distance between the first volume and the target value.

Of course, it is possible to implement this embodiment independently of the other proposed embodiments.

In addition, the target value may be the maximum value.

A device for the controlled determination of channels on the basis of a model can be advantageous in and of itself, since it can take dynamic constraints into account for the generation of channels.

Thus, the invention also provides a device for implementing all or part of the method described above.

A computer program implementing all or part of the method described above, installed on existing equipment, is advantageous in and of itself, since it allows the controlled determination of channels from a model.

The invention therefore also provides a computer program comprising instructions for implementing the method described above when the program is executed by a processor.

This program may use any programming language (for example an object language or some other language), and may be in the form of readable source code, partially compiled code, or fully compiled code.

FIG. 4, described in detail below, can serve as the flowchart for the general algorithm of such a computer program.

BRIEF DESCRIPTION OF THE DRAWINGS

Other features and advantages of the invention will become apparent upon reading the following description. This description is purely illustrative and should be read with reference to the accompanying drawings, in which.

DETAILED DESCRIPTION OF THE DRAWINGS

Figure 1:
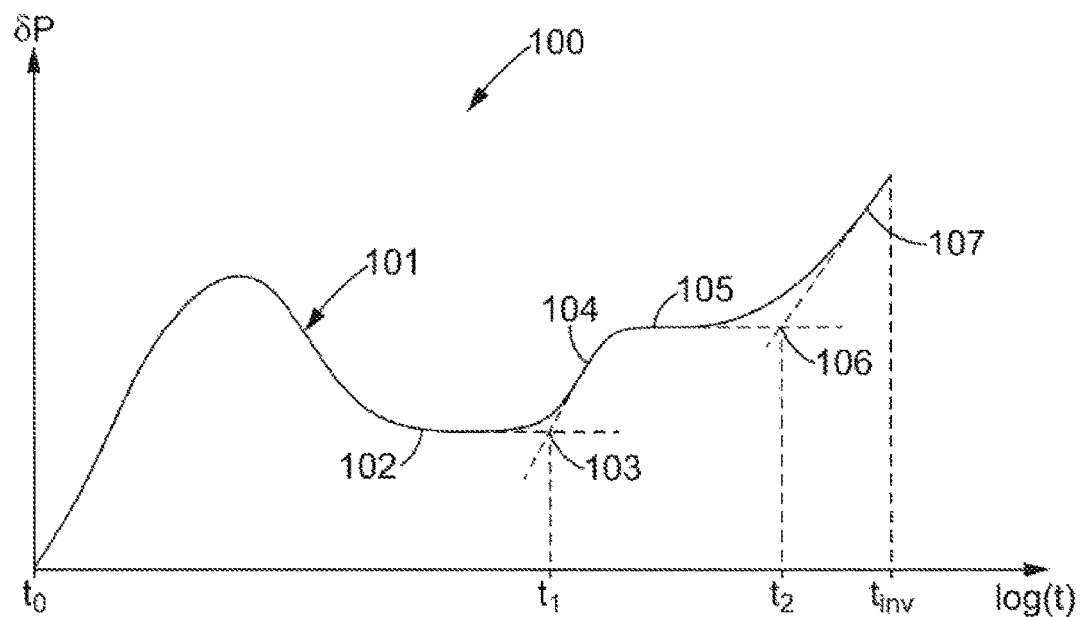
FIG. 1 illustrates an exemplary pressure variation curve during a well test and during a buildup phase, illustrating a determination of boundaries.

FIG. 1 illustrates an example pressure variation curve 100 during a well test, and more specifically during a buildup phase.

Shut in of a well in production (corresponding to $t_0$ on the curve in FIG. 1). The pressure variation 101 at well output evolves over a second period until it stabilizes (region 102, corresponding to a steady increase in well pressure).

If the pressure variation increases abruptly (region 104) then re-stabilizes (region 105), well engineers can interpret this phenomenon to mean the presence of a boundary in the reservoir connected to the well (for example the presence of a region in the subsurface that contains no oil or gas, presence of impermeable rock, etc.). The time $t_1$ when such a phenomenon occurs (region 103) can enable them to determine the distance $r_1$ from the well to this first boundary. These determinations can use methods such as those described in the references mentioned above.

If a second boundary is present in the reservoir (substantially opposite to the first boundary), the pressure variation curve then exhibits growth (region 107) starting at time $t_2$ (region 106). The time $t_2$ at which such a phenomenon occurs (region 106) can enable well engineers to determine the distance $r_2$ from the well to this second boundary.

It is also possible to define an investigation distance corresponding to the time $t_{inv}$ when the pressure variation data are no longer available or are no longer considered reliable.

Figure 2:
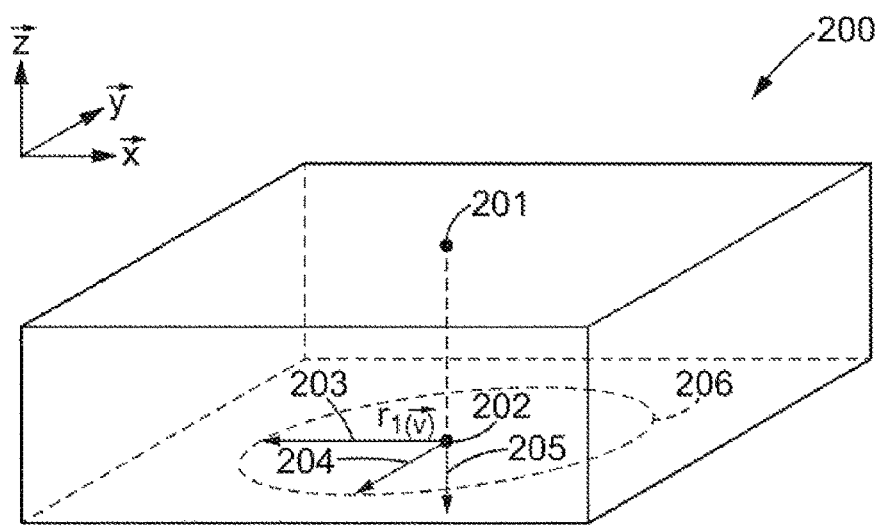
FIG. 2 illustrates an exemplary embodiment of a model comprising a well representation in one embodiment of the invention.

FIG. 2 illustrates an exemplary embodiment of a model 200 comprising a well representation according to an embodiment of the invention.

Most often, a well can be represented in a model by a vertical line passing through a first point 201 (the drilling point or the wellhead) and a second point 202 (or a set of points 202). The point or set of points 202 corresponds to a region of the well having perforations and connecting the subsurface to the well which enables hydrocarbon extraction. The point or set of points 202 is called a "well representation" for simplification.

When determining a boundary as described above, in relation to FIG. 1 for example, it is possible to determine a region 206 around the point 202 and representing potential points of existence of this boundary. In this figure, the distance from one end of this region to point 202 may vary with the direction. For example, the distance represented by vector 203 may be different from the distance represented by vector 204 (both in plane $(\vec{x}, \vec{y})$). This difference can be explained by the knowledge of specific constraints (for example anisotropy of the subsurface). Similarly, the distance represented by vector 203 may be different from the distance represented by vector 205 (the vertical distance is often known to be less than the horizontal distances, as geological layers are primarily horizontal).

Figure 3A:
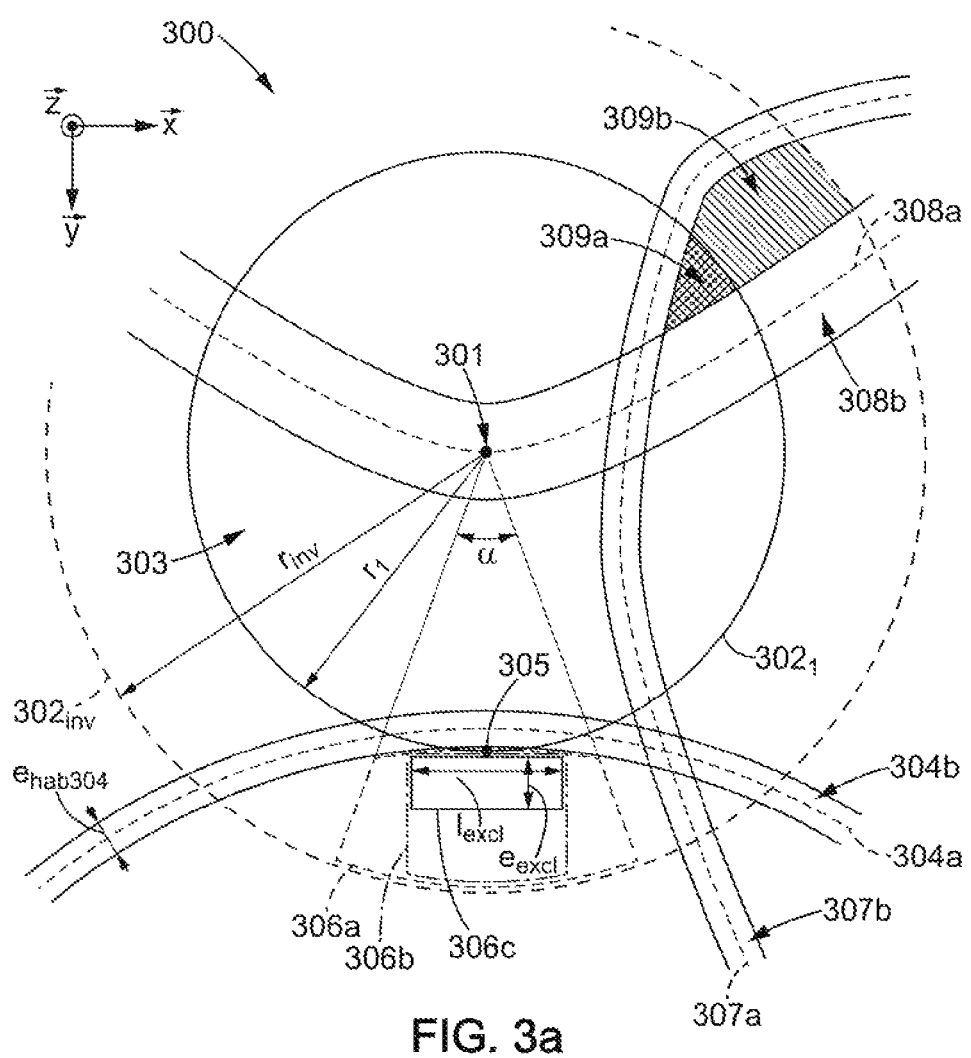
FIGS. 3a and 3b show horizontal cross-sections of a model in one embodiment of the invention.

FIG. 3a shows a horizontal cross-section 300 of a model in one embodiment of the invention.

This section 300 is formed such that point 301 corresponds to a region of the well representation.

In this example, the first distance $r_1$ represents a minimum distance to boundary and is constant in all directions of the cross-section plane $(\vec{x}, \vec{y})$. The distance $r_{inv}$ represents an investigation distance and is constant in all directions of the cross-section plane $(\vec{x}, \vec{y})$. In other examples, the distances $r_1$ and $r_{inv}$ can vary depending on the direction considered. Distance $r_1$ defines polar form $302_1$ (here a circle of radius $r_1$ and having its center at point 301) and distance $r_{inv}$ defines polar form $302_{inv}$ (here a circle of radius $r_{inv}$ and having its center at point 301).

First, it is possible to determine a first path 304a. This path may, for example, be determined using a method as described by patent application FR1060053 or FR1257649.

This path is determined such that the casing 304b of this path 304a is tangent to polar form $302_1$ (here a circle, the radius r1 being constant in all directions of the cross-section plane $(\vec{x}, \vec{y})$) at point 305, also called the "point of minimum tangency." Of course, it is possible to consider the casing as being tangent to the polar form even if the tangency is imperfect: as the model is usually discrete due to its gridding, it is possible to provide a tolerance value (for example a limit angle) below which the casing is considered to be tangent. To ensure tangency at the casing, it is possible to reduce the distance $r_1$ by half the casing thickness $e_{hab304}$ at the point of tangency 305 and to determine a new polar form having point 301 as its center and having radius $$r_1 - \frac{e_{hab304}}{2}$$

and to determine the path 304a such that it is tangent to this new polar form.

Once the path 304a and the casing 304b of this path are determined, it is possible to determine an exclusion region in the model in which no path and no casing are determined. This exclusion region can be, for example:

the region 306a defined by a region between polar form $302_1$ and polar form $302_{inv}$ and in an angle $\alpha$ from point 301 and centered on point 305;

the region 306b defined by a region between polar form $302_1$ and polar form $302_{inv}$ and having a given width $e_{excl}$;

the region 306c defined by a region beyond polar form $302_1$ and tangent thereto, having a given width $1_{excl}$ and a given thickness $e_{excl}$.

Of course, other forms of exclusion regions are possible, and combinations of forms as described above are conceivable.

It is then possible to determine a new path 307a and a new associated casing 307b within the model 300. This determination may also be performed according to a method as described in the patent applications cited above.

No point of this path or this casing is part of the exclusion region as defined above.

One will keep in mind that the distance $r_1$ is representative of the existence of a boundary located at this distance $r_1$, detected from the well. It is therefore useful that this well (or more precisely its representation) be connected to casing 304b. Thus, if the well is not connected to casing 304b through other casings, it may be useful to continue determining new casings until the well 301 is connected: if the union of casings 304b and 307b does not contain the well 301, new paths (308a) and new casings (308b) are determined.

Conversely, if the distance $r_1$ is representative of the existence of a minimum boundary, this can also mean that no there is no boundary (or no boundary detectable by current methods) within the region bounded by polar form $302_1$. As a result, it may be useful to identify new paths and new casings as long as the region bounded by polar form $302_1$ contains regions (309a) of significant size that are not part of any casing. The size of each region may, for example, be evaluated:
- by the number of points;
- by the volume;
- by the surface area;
- by the value of the solid angle as seen from point 301.

The limit value beyond which the region 309a is considered to be too large can be set according to the sensitivity of the measurement instruments available. In one embodiment, this limit may be set to zero.

Moreover (and if no other detected boundaries exist, for example, within the limits of the investigation region, i.e. polar form $302_{inv}$), it is also possible to determine new paths and new casings. This determination is performed as long as the region bounded by polar form $302_{inv}$ contains regions (309a and 309b) of significant size and that are not part of any casing.

Of course, in the latter case, the determined exclusion regions do not have to be taken into account in the determination of regions of significant size, since by definition the exclusion regions cannot have a casing. In addition, regions "covered" by the exclusion regions (i.e. regions of polar form $302_{inv}$ located behind the exclusion regions relative to the well representation 301) do not have to be taken into account in the determination of regions of significant size.

Finally, and without limitation, if the distance $r_1$ is representative of the existence of a minimum boundary, this may also mean that the set of points, located in the region bounded by polar form $302_1$ and that are part of a casing, is connected to the well. If certain points of casings present in this region are not connected to the wells (i.e. there are no pathways traveling through casings that connect the well representation and this point, the pathway being contained in form $302_1$), this can mean that several casing networks coexist within form $302_1$ without being connected to one another: thus a boundary closer than the boundary symbolized by distance $r_1$ should have been detected. Consequently, it may be useful to identify new paths and new casings if this last condition is not satisfied.

This condition can also be rewritten to consider the intersection of:
- the region formed of polar region $302_1$, and
- the union of the casings determined in the model.

If this intersection forms a plurality of sets of points that are connected (i.e. continuous), then this condition is considered to have been satisfied.

Furthermore (and if no other detected boundaries exist for example within the limits of the investigation region, i.e. of polar form $302_{inv}$), it is also possible to determine new paths and new casings as long as the region bounded by polar form $302_{inv}$ contains casings that are disconnected from the well representation.

Figure 3B:
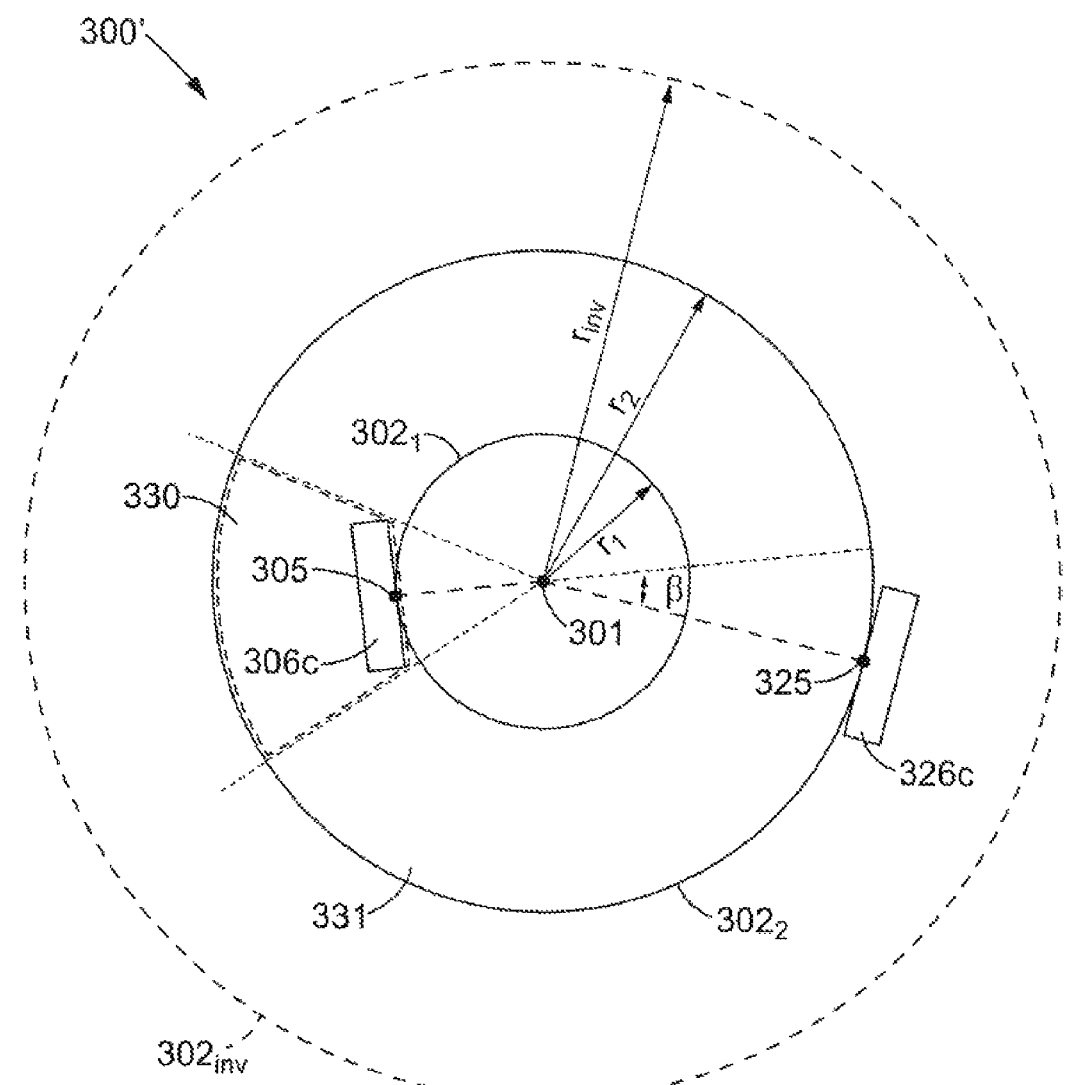

FIG. 3b illustrates another example of a horizontal cross-section 300' of a model in one embodiment of the invention.

In this section, two boundaries have been determined:
- a boundary located at point 305 and represented by exclusion region 306c. This boundary is at a distance $r_1$ from the well representation 301;
- a boundary located at point 325 and represented by exclusion region 326c. This boundary is at a distance $r_2$ from the well representation 301.

As indicated above in relation to FIG. 1, the detection of a second boundary during a well test allows knowing whether it is located substantially opposite to the first boundary. The signature of the pressure variation curve can be characteristic of such a situation.

Points 305, 301, and 325 are thus usually considered to be aligned. Of course, because of the discretization of the model and the limited accuracy of pressure variation detection tools, these points may not be perfectly aligned: for example, the angle formed by lines (305-301) and (301-325) may be no greater than $180°\pm\varepsilon$ with $\varepsilon$ being an angle set by an operator. In the case of FIG. 3b, $\beta \leq \varepsilon$.

In a situation with two boundaries, it is possible to add new conditions that the model must satisfy, otherwise new paths and new casings are determined:
- the region between polar form $302_1$ and polar form $302_2$ does not contain any sets of points that are continuous and that are not part of a casing of more than a predetermined number of points. For this condition, it is possible to exclude from the region between polar form $302_1$ and polar form $302_2$ the region covered by the exclusion regions of the model, here the region 330 covered by exclusion region 306c. This region 330 is the region formed by a sector of the region between polar form $302_1$ and polar form $302_2$, in the solid angle defined by the exclusion region: thus the region between polar form $302_1$ and polar form $302_2$ and not containing any sets of points that are continuous and are not part of a casing of more than a predetermined number of points is region 331;
- casings present in the region between polar form $302_1$ and polar form $302_2$ (with the possible exclusion of region 330 as explained above) do not form discrete sets of regions.

Figure 3C:
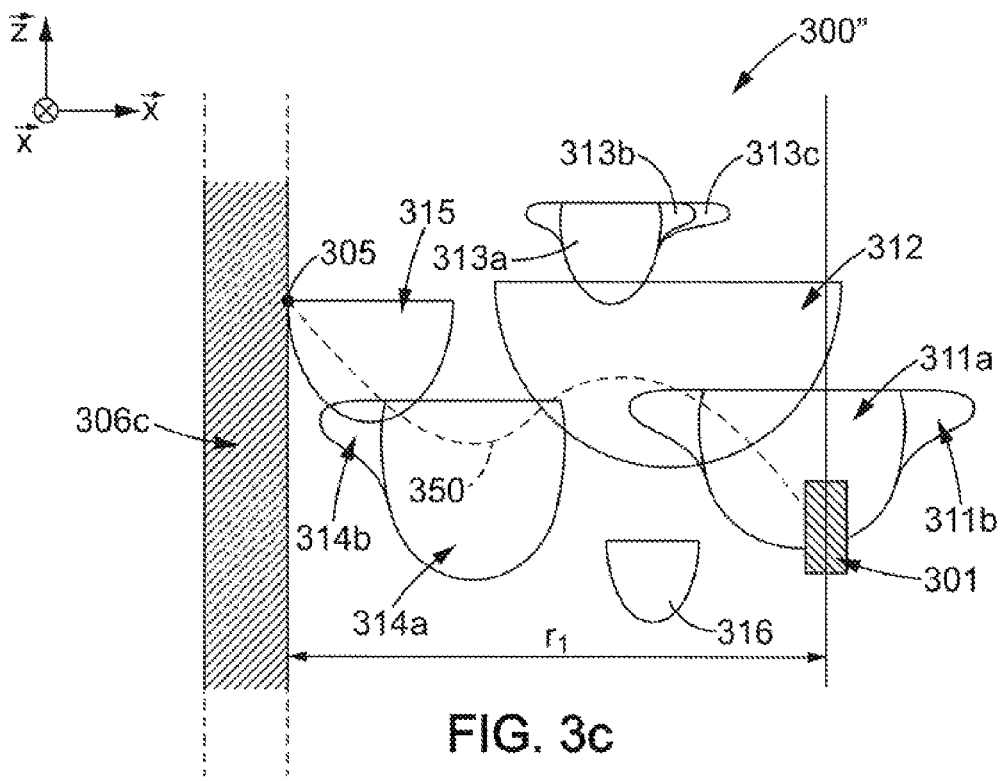
FIG. 3c shows a vertical cross-section of a model in one embodiment of the invention.

FIG. 3c shows a vertical cross-section of a model 300" according to an embodiment of the invention.

Although FIGS. 3a and 3b show horizontal cross-sections, the models can be three-dimensional models and allow a representation with vertical cross-sections.

In this example, the well representation 301 may comprise a plurality of superimposed meshes of the model. In addition, the exclusion region 306c may comprise a plurality of meshes of the model, distributed in a given parallelepiped.

The casings of the channels may have different sizes, shapes, or compositions. By way of illustration, a channel may consist of a single facies in the model, such as channels 315, 312, or 316. Or the channels may comprise multiple facies (for example the presence of a channel bed but also accretions, lobes, levees, etc.): for example, region 314b is an accretion region of channel 314a, region 313b or 313c is an accretion region of channel 313a, region 311b is an accretion region of channel 311a.

A channel may comprise a large number of component elements, but only the elements among these component elements which allow circulation and/or storage of sufficient hydrocarbons (or other specific criteria, particularly geophysical criteria) are called "casings". Thus, the well engineer or other operator can select items that he considers part of the casing in the meaning of the invention.

The union of the casings shown in FIG. 3c contains two sets of casings that are unconnected (discrete):
- a first set comprising casing 316;
- a second set comprising casings 315, 314b-314a, 312, 313a-313b-313c, and 311a-311b.

In the second set, it is possible to identify at least one path 350 connecting the well representation 301 to the point of tangency of the minimum boundary 305.

Figure 4:
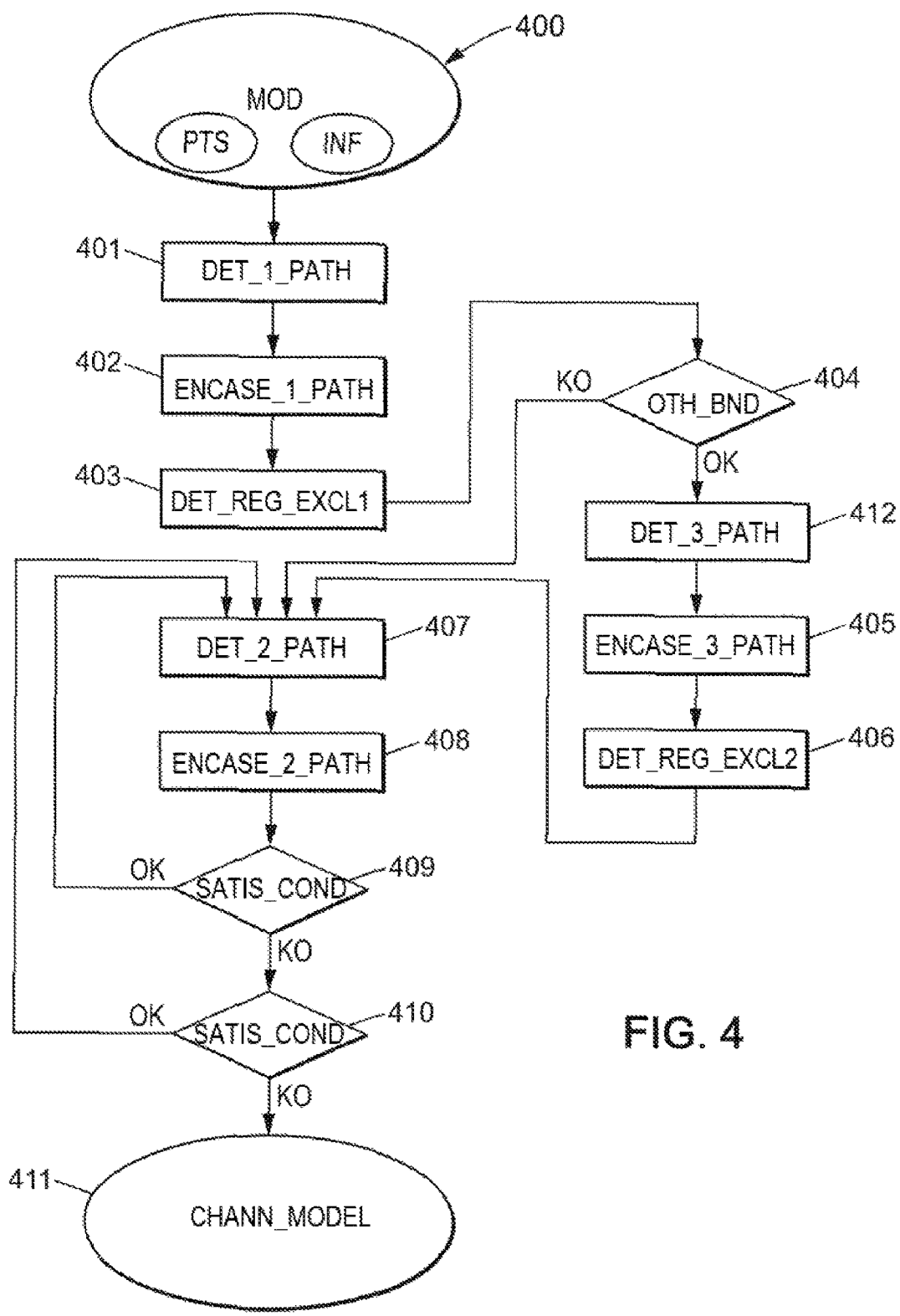
FIG. 4 shows an example of a flowchart which can represent one possible implementation of the invention.

FIG. 4 shows an example of a flowchart which can represent one possible implementation of the invention.

Upon receiving a model 400, it is possible to perform a controlled channel determination. This received model 400 comprises a space of points (PTS) and other information (INF) such as a well representation in this space or the indication of a minimum distance to boundary associated with this representation.

Once received, it is possible to determine (step 401) a first channel path 400 in this model.

Thus it is possible to encase (step 402) this path with an envelope or "casing". The casing may be of constant width but it may also vary along this path. In any event, it is determined such that it is internally tangent to a polar form having the well as its center and as its radius the received minimum distance to boundary.

Depending on the point of tangency of this exclusion region to the polar form, it is possible to determine (step 403) at least one minimum exclusion region as described above.

It is then possible to examine whether a second boundary exists in the model. This is the case if a second distance to boundary is associated with the well representation.

If some other boundary exists (test 404, OK arrow), it is then possible to determine a third channel path (step 412). This third path has a casing (step 405) in the same conditions as described above and this casing is internally tangent to the polar form having the well as its center (or more precisely the well representation in the model) and as its radius this other distance to boundary.

Lastly, it is possible to determine at least a second exclusion region from the point of tangency of this casing with the polar form.

Of course, the second exclusion region does not have any point in common with the first casing determined in step 402 or with any other casing determined in step 405. In addition, the third casing has no point in common with the minimum exclusion region determined in step 403.

If no other boundary exists (test 404, KO arrow) or if all of steps 412, 405, and 406 are completed, a second channel path is determined (step 407). With this last path, it is possible to determine a corresponding casing as previously described (step 408). Of course, this last casing has no point in common with an exclusion region that was previously determined (step 403 or step 406).

If any of the following conditions are satisfied (test 409, OK arrow), steps 407 and 408 can be repeated:

the well representation is not part of any previously determined casing (step 402 or 405 or 408).

there is a region of at least a predetermined number of points in the region located at a distance less than the minimum distance to boundary and not part of any casing.

the casings are not all connected in the region located at a distance less than the minimum distance to boundary.

In addition, there may be other conditions which cause steps 407 and 408 to be repeated if not satisfied (410 test, OK arrow). It is possible that test 409 or test 410 is the only test performed in the method described in relation to FIG. 4.

For example, the model may also include a minimum connected volume value. It is then possible to determine the volume of hydrocarbons connected to the well and present in the casings determined in the previous steps. The connected volume can be the volume of casings for which there exists in the determined casings a path through a point of the casing considered and through the well. This volume may be weighted by a weighting factor (for example, related to the porosity of the subsurface in the casings concerned). This volume may also be based on an exploration distance, for example the volumes located beyond this distance are not taken into account when determining the connected volume (or are taken into account with a weighting factor which decreases with distance).

If the minimum connected volume value is not reached, it is possible to determine new paths and new casings (step 407 and 408).

If the minimum connected volume value is exceeded, this last casing is retained. In certain extreme conditions it may be impossible to satisfy the conditions of test 409 and the conditions of test 410. If after a given number of iterations, it is found that the conditions of test 410 cannot be satisfied (completely or partially, for example the minimum value of the volume is very large and it is not possible to reach it even by connecting all regions located at a distance less than the investigation distance, therefore the value calculated as the connected volume no longer changes during a predetermined number of iterations), an alert can be raised.

In addition, test 410 may contain a condition concerning a maximum connected volume value. In this case, it is possible to determine a target value for the connected volume, between the minimum value and the maximum value: this determination may be made using a stochastic process (linear or Gaussian for example).

Once this target value has been determined, it is possible to determine a new channel path (step 407) and a new casing (step 408).

This new path and this new casing are only retained in the final model:
- if the connected volume with this new casing is still below this target value; or
- if the connected volume with this new casing is greater than this target value and if the distance between the connected volume with this new casing and the target value is less than the distance between the connected volume without this new casing and the target value.

Furthermore, if the connected volume with this new casing is still less than this target value, steps 407 and 408 are repeated.

Once all the conditions of tests 409 and 410 are not met, the model 411 containing the new paths and new casings is returned.

The block diagram presented in FIG. 4 is a typical example of a program in which some instructions may be carried out by the described device. As such, FIG. 4 can correspond to the flowchart of the general algorithm of a computer program in the meaning of the invention.

Figure 5:
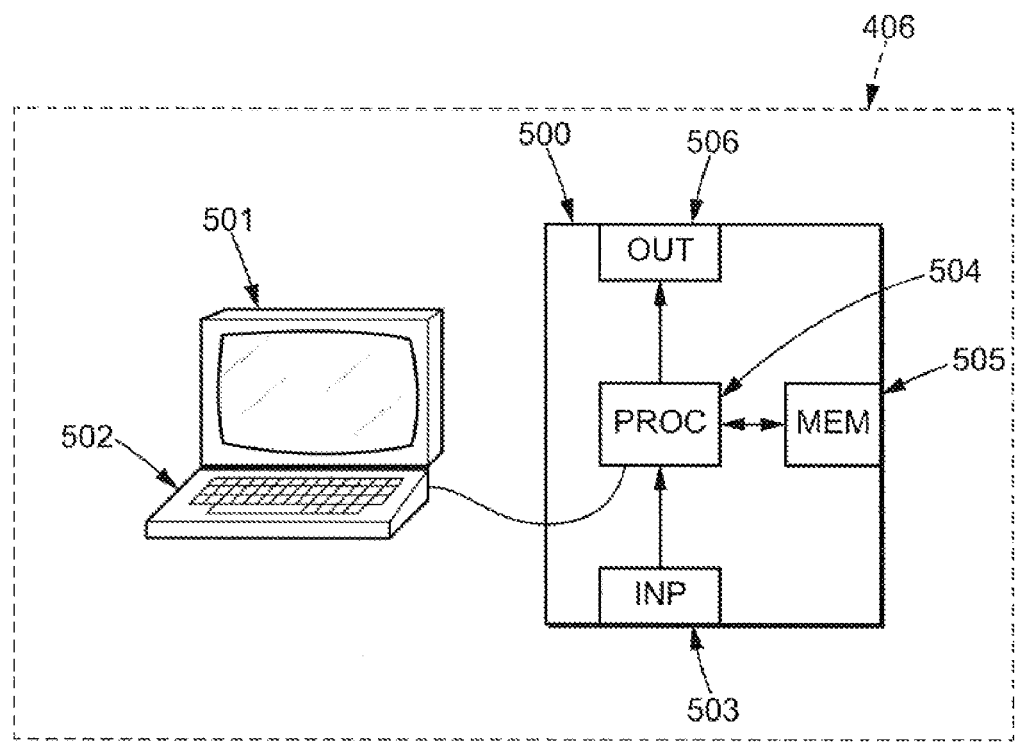
FIG. 5 shows a device for implementing an embodiment of the invention.

FIG. 5 shows an exemplary device in one embodiment of the invention.

In this embodiment, the device includes a computer 500 comprising a memory 505 for storing instructions enabling the implementation of the method, measurement data received, and temporary data for carrying out the various steps of the method as described above.

The computer further comprises a circuit 504. This circuit may be, for example:
- a processor capable of interpreting instructions in the form of a computer program, or
- an circuit board in which the steps of the inventive method are described in the silicon, or
- a programmable chip such as a FPGA (Field-Programmable Gate Array) chip.

This computer comprises an input interface 503 for receiving measurement data, and an output interface 506 for providing models. Lastly, the computer may comprise a screen 501 and a keyboard 502, for easy user interaction. Of course, the keyboard is optional, particularly in the context of a computer in the form of a touchpad, for example.

Of course, the invention is not limited to the embodiments described above as examples; it extends to other variants.

Other embodiments are possible.

For example, the examples given with reference to the Figures concern three-dimensional models, but an embodiment of the invention based on a two-dimensional model is also feasible.

The invention claimed is:

1. A method, implemented by computer, for the controlled determination of channels on the basis of a model comprising at least:
   a space of points, said points having coordinates in said space,
   a representation of a well in said space, said well representation having coordinates in said space, a first distance to boundary being associated with said representation,
wherein the method comprises the steps of:
   determining a first channel path in said model, said first path having a first casing, said first casing being internally tangent at a first point of tangency to a polar form having a center that is part of the representation and having a radius that is said first distance to boundary associated with said representation;
   determining at least one first exclusion region in said model as a function of said point of tangency; and
   determining at least one second channel path in said model, said second path having a second casing, the intersection of the at least one first exclusion region and said second casing being empty, and determining a union between said first path and said at least one second path;
and wherein the step of determining at least one second path is repeated if at least one condition is satisfied in a set of conditions comprising:
   the intersection of said well representation and said determined union is empty.

2. The method according to claim 1, wherein the set of conditions further comprises:
   the intersection of the points of the model located at a distance less than the first distance to boundary of said representation and the complement of said union forms at least one continuous set of points of at least a predetermined number of points.

3. The method according to claim 1, wherein the set of conditions further comprises:
   the intersection of the points of the model located at a distance less than the first distance to boundary of said representation and said determined union in the space forms a plurality of sets of points that are discrete.

4. The method according to claim 1, wherein, a second distance to boundary being associated with said representation, the method further comprises:
   determining a third channel path in said model, said third path having a third casing, said third casing being internally tangent to a polar form having a center that is part of the representation and having a radius that is said second distance to boundary, said casing being tangential at a second point of tangency; and
   determining at least one second exclusion region in said model as a function of said second point of tangency;
and wherein:
   the intersection of the at least one second exclusion region and said first casing or the at least one second casing or the third casing is empty;
   the intersection of the at least one first exclusion region and the third casing is empty.

5. The method according to claim 4, wherein the second point of tangency, a point that is part of the representation, and the first point of tangency are aligned.

6. The method according to claim 4, wherein a first straight line passing through the second point of tangency and a point that is part of the representation, and a second straight line passing through the point that is part of the representation and the point of minimum tangency, form an angle that is between 180° and a predetermined angle.

7. A method, implemented by computer, for the controlled determination of channels on the basis of a model comprising at least:
   a space of points, said points having coordinates in said space,
   a minimum connected volume value;
   at least one representation of a well in said space, said well representation having coordinates in said space, a first distance to boundary being associated with said representation,
wherein the method comprises the following steps, for each current representation in the at least one well representation:
   /a/ determining a first channel path in said model, said first path having a first casing, said first casing comprising the at least one well representation, and adding said first path to a set of paths;
   /b/ determining at least one second channel path in said model, said second path having a second casing;
   /c/ if the second path is connected to a path in the set of paths, adding said second path to the set of paths, otherwise repeating steps /b/ and /c/;
   /d/ determining a connected volume as a function of the paths in the set of paths, and if the determined volume is less than the minimum value, repeating steps /b/ and /c/.

8. The method according to claim 7, wherein, said model having at least one maximum connected volume value, the method further comprises:
   /$a_a$/ determining a target connected volume value that is between the minimum value and the maximum value;
   /$b_a$/ determining at least a fourth channel path in said model, said fourth path having a fourth casing;
   /$c_a$/ determining a first connected volume as a function of the paths in the set of paths, and determining a second connected volume as a function of the paths in the set of paths and of the fourth path;

/$d_d$/ if the fourth path is connected to a path in the set of paths and if the first determined volume is less than or equal to the target value, adding said fourth path to the set of paths and repeating steps /$b_d$/, /$c_d$/, /$d_d$/, and /$e_d$/;

/$e_d$/ if the fourth path is connected to a path in the set of paths and if the second determined volume is greater than the target value:

adding said fourth path to the set of paths and repeating steps /$b_d$/, /$c_d$/, /$d_d$/, and /$e_d$/ if a distance between the second volume and the target value is less than a distance between the first volume and the target value.

9. The method according to claim 8, wherein the target value is the maximum value.

10. A device for the controlled determination of channels on the basis of a model comprising at least:

a space of points, said points having coordinates in said space, a representation of a well in said space, said well representation having coordinates in said space, a first distance to boundary being associated with said representation, wherein the device comprises a computer and a processor to execute:

a circuit adapted to determine a first channel path in said model, said first path having a first casing, said first casing being internally tangent to a polar form having a center that is part of the representation and having a radius that is said first distance to boundary associated with said representation, said casing being tangential at a first point of tangency;

a circuit adapted to determine at least one first exclusion region in said model as a function of said first point of tangency;

a circuit adapted to determine at least one second channel path in said model, said second path having a second casing, the intersection of the at least one first exclusion region and said second casing being empty, and to determine a union between said first path and said at least one second path;

and wherein the circuit adapted to determine at least one second path is adapted to repeat said last step if at least one condition is satisfied in a set of conditions comprising:

/c1/ the intersection of said well representation and said determined union is empty.

11. A non-transitory machine-readable storage medium comprising instructions for carrying out a controlled determination of channels on the basis of a model; compromising at least:

a space of points, said points having coordinates in said space, a representation of a well in said space, said well representation having coordinates in said space, a first distance to boundary being associated with said representation, wherein the instructions include the steps comprising:

determining a first channel path in said model, said first path having a first casing, said first casing being internally tangent at a first point of tangency to a polar form having a center that is part of the representation and having a radius that is said first distance to boundary associated with said representation;

determining at least one first exclusion region in said model as a function of said first point of tangency; and determining at least one second channel path in said model, said second path having a second casing, the intersection of the at least one first exclusion region and said second casing being empty, and determining a union between said first path and said at least one second path;

and wherein the step of determining at least one second path is repeated if at least one condition is satisfied in a set of conditions comprising: the intersection of said well representation and said determined union is empty.

* * * * *